Dec. 16, 1930.  H. A. BALLARD  1,784,955
PORTABLE IRRIGATION HEAD GATE
Filed Aug. 29, 1928   2 Sheets-Sheet 1
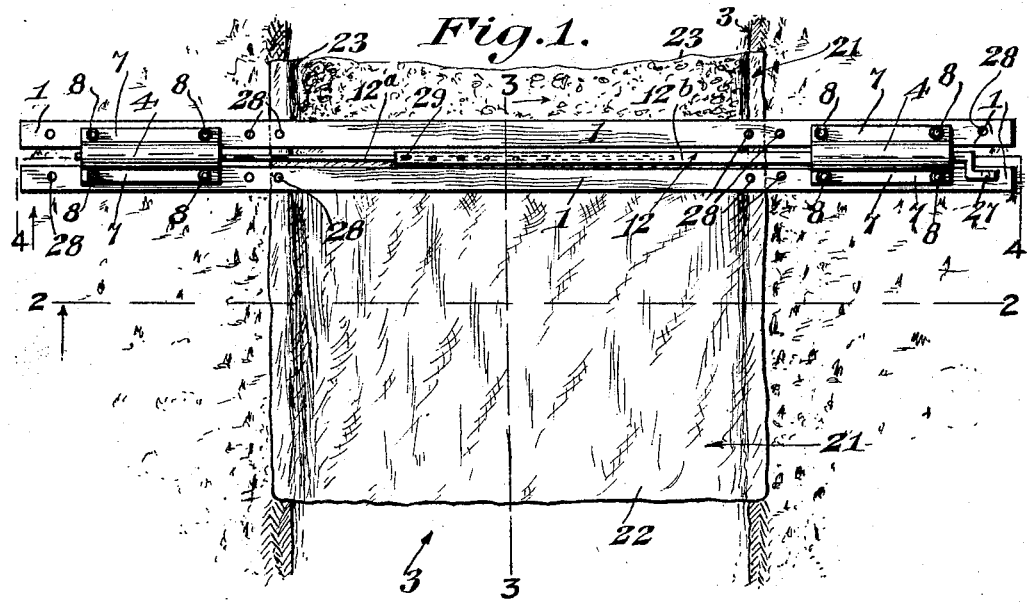
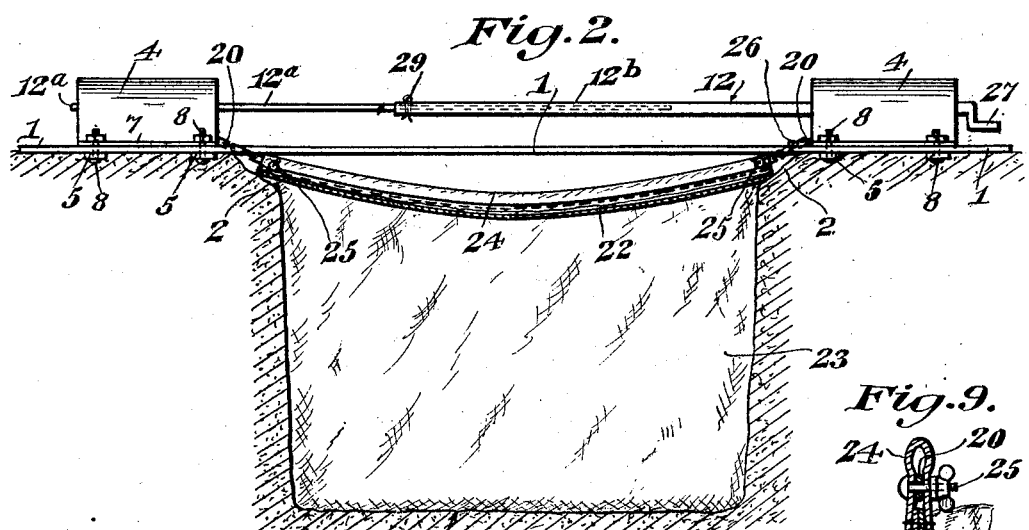
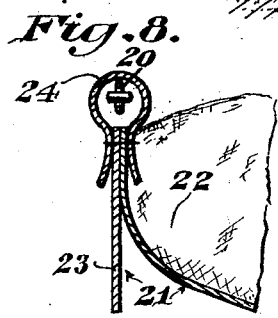
Howard A. Ballard, INVENTOR.
BY Irving L. McEathran
ATTORNEY Dec. 16, 1930.  H. A. BALLARD  1,784,955
PORTABLE IRRIGATION HEAD GATE
Filed Aug. 29, 1928  2 Sheets-Sheet 2
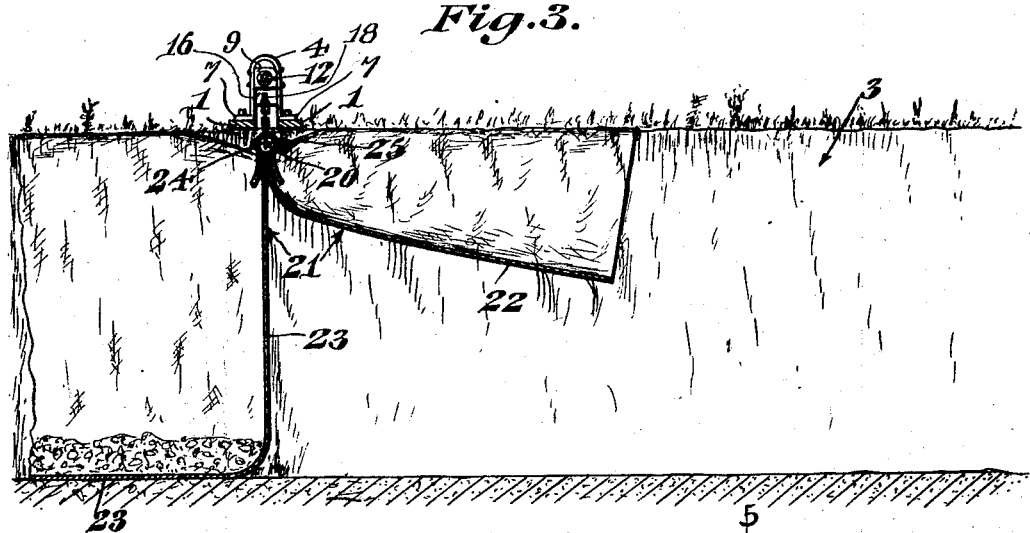
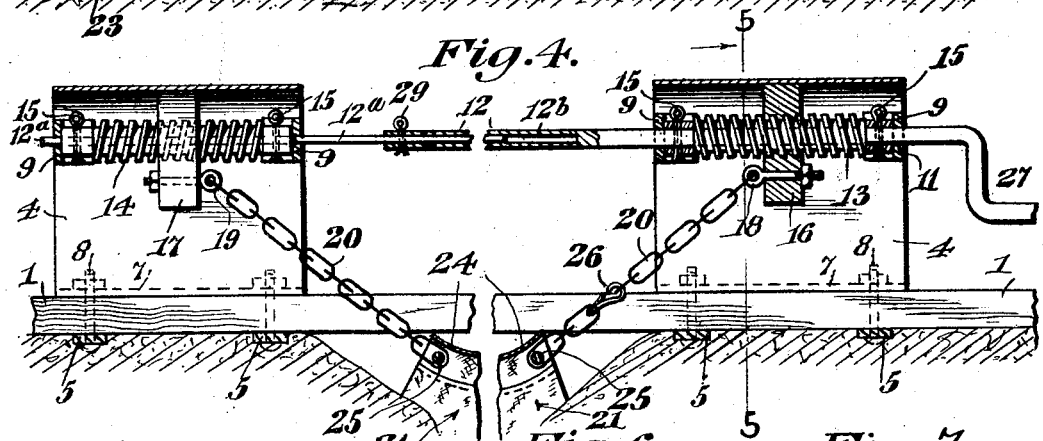
INVENTOR.
Howard A. Ballard,
BY
Irving L. McGathran
ATTORNEY Patented Dec. 16, 1930

1,784,955

UNITED STATES PATENT OFFICE

HOWARD A. BALLARD, OF CLARKSBURG, CALIFORNIA

PORTABLE IRRIGATION HEAD GATE

Application filed August 29, 1928. Serial No. 302,857.

This invention relates to irrigating headgates, and has for one of its objects to provide a novel device of this character which shall embody a flexible dam and be adapted for use in connection with the check, contour and furrow methods of irrigation and which shall be adapted to handle a complete head of water in any field ditch or lateral from six inches to six feet wide.

The invention has for a further object to provide a headgate of the character stated which shall be adapted to be easily and quickly installed or removed and which shall be light enough to permit it to be readily carried from one field ditch or lateral to another.

The invention has for a further object to provide a headgate of the character stated wherein the flexible dam shall be adapted to be easily and quickly adjusted in a manner to effect the blocking of the whole stream of water or to prevent the passage thereby of such portion of the stream as best adapted to suit the requirements of the particular crop or crops under cultivation, the size, shape and slope of the field, and the nature of the soil.

The invention has for a further object to provide a headgate of the character stated which shall be simple, durable and capable of being manufactured and sold at a comparatively low cost and which shall embody a construction adapted to permit worn or otherwise damaged parts to be cheaply and readily replaced.

With the foregoing and other objects in view the nature of which will appear as the description proceeds, the invention consists in the construction, combination and arrangement of parts hereinafter fully described and claimed, and illustrated in the accompanying drawings, wherein:

Figure 1 is a top plan view illustrating the application of the headgate to a field ditch or lateral;

Figure 2 is a sectional view taken on the vertical plane indicated by the line 2—2 of Figure 1;

Figure 3 is a sectional view taken on the vertical plane indicated by the line 3—3 of Figure 1;

Figure 4 is a sectional view taken on the vertical plane indicated by the line 4—4 of Figure 1;

Figure 5 is a sectional view taken on the vertical plane indicated by the line 5—5 of Figure 4;

Figure 6 is a detail horizontal sectional view of one of the housings of the headgate;

Figure 7 is a view partly in vertical section and partly in end elevation of the housing, and Figures 8 and 9 are detail sectional views illustrating the manner in which the flexible dam is connected to the flexible supporting and adjusting member therefor.

The headgate comprises a pair of strips or beams 1 which are of such length as to adapt them to extend across any ordinary sized field ditch or lateral. The beams rest upon the banks 2 of the ditch or lateral 3, and may be secured in place in any suitable manner. While they may be made from wood or metal, the beams 1 are preferably made from wood in order to permit them to be readily replaced in the event of their being broken. The beams 1 are arranged in spaced parallel relation, and are secured in such relation by housings 4 and tie plates 5. The housings 4 are of inverted U-form in cross section, and are arranged upon the beams 1 laterally beyond the sides of the field ditch or lateral 3 and with their opened lower sides in longitudinal alinement with the opening or slot 6 between the beams. The housings 4 are provided at their lower edges with outwardly extending adjusting flanges 7 which rest upon the beams 1. Bolts 8 which extend through the beams 1, tie plates 5 and flanges 7, secure the beams, tie plates and housings 4 together. Bars 9 are secured, as at 10, to and across the inner and outer ends of the housings 4, and are arranged adjacent the upper sides of the housings and are provided with bearing openings 11.

A shaft 12 extends through the housings 4, and is rotatably supported by the bearings 11 in vertical alinement with the slot 6. A right-hand screw 13 and a left-hand screw 14 having square faced threads, are mounted upon the shaft 12, and are fixed to the shaft by cotter pins 15 or other suitable elements. The respective screws 13 and 14 are arranged within the respective housings 4, and each screw is positioned between and contacts with the bars 9 of its housing so as to hold the shaft 12 against longitudinal movement. A nut or follower 16 is arranged upon the screw 13 and a nut or follower 17 is arranged upon the screw 14, and these parts contact with the top and lateral sides of the housings 4 and are thereby held against any turning movement with respect to the screws 13 and 14. The followers 16 and 17 are provided below the screws 13 and 14 with eye bolts 18 and 19, respectively. A flexible member 20 which is preferably in the form of a chain, is positioned between the followers 16 and 17, and is secured at its ends to the eye bolts 18 and 19.

A flexible dam 21 which is preferably made from canvas and comprises similar members 22 and 23, is arranged within the field ditch or lateral 3 and is carried by and suspended from the member 20. The dam member 23 which is located at the up-stream side of the dam 21 has its lower end and side portions arranged in contact with the bottom and sides and top of the banks of the field ditch or lateral whereby to permit the pressure of the water to hold it firmly in place. If desired earth may be placed in said portions of the member 23 to assist in holding said member in place. The other member 22 of the dam 21 which is located at the down-stream side of the dam swings free in the ditch or lateral and constitutes a spillway which prevents the erosion and washing away of the soil directly below the headgate. The dam members 22 and 23 are of the same area so as to permit the headgate to be applied with either one arranged upstream.

The dam members 22 and 23 are secured together at their upper ends in a manner to provide a loop 24 for the reception of the suspending member 20. The dam 21 is held against movement on and in the direction of the length of the suspending member 20 by bolts 25 which extend through the upper corners of the dam and through certain links of the suspending member. To permit the dam 21 to be readily applied to the suspending member 20 or removed therefrom, the suspending member is made in sections and the sections thereof are connected together by a snaphook 26.

The suspending member 20 extends downwardly and inwardly from the followers 16 and 17 and downwardly through the slot 6 and across the ditch 3. The extent or degree of the sag of the suspending member 20 may be varied to regulate the amount of water flowing through the ditch past the dam 21 or to entirely cut off the flow of water through the ditch, and this may be easily and quickly done by rotating the shaft 12 through the medium of a hand crank 27. When the crank 27 is turned in a clockwise direction the followers 16 and 17 are caused to move away from each other, with the result that the extent of the sag of the member 20 is reduced and the dam 21 is elevated. When the crank 27 is turned in a counter-clockwise direction the followers 16 and 17 are caused to move in the direction of each other, with the result that the extent of the sag of the member 20 is increased and the dam 21 is lowered. The connection between the screws 13 and 14 and the followers 16 and 17 is such that the latter are held against any accidental movement on the former and the dam 21 is held positively in adjusted position.

In order to adapt the headgate for use in connection with field ditches or laterals of different widths, the casings 4 are adapted to be adjusted toward and away from each other on the beams 1 and the length of the shaft 12 is adapted to be increased or decreased. To permit the stated adjustment of the housings, the beams 1 are provided with a plurality of series of openings 28 for the reception of the bolts 8. To permit the length of the shaft 12 to be varied, this part is made in sections, and the sections 12$^a$ and 12$^b$ thereof are telescopically associated and connected in their adjusted relation by cotter pins 29.

The headgate may be installed in any field ditch or lateral in a few seconds. The crank 27 will occupy a position up out of the mud and will be easy of access. A few turns of the crank 27 in a clockwise direction will raise the dam 21 and stop the flow of water, and a few turns of the crank in the opposite direction will lower the dam and start the flow of the water and this may be done without straddling the ditch. The headgate may be used as an ordinary canvas dam to stop the whole head of water; to regulate or divide a head of water in a field ditch or lateral; to maintain a water level in a ditch in furrow irrigation; to raise the water level; to force water out of a ditch into furrows, allowing the balance of the head to flow on down the ditch to serve other furrows, and as a headgate to take water out of a field ditch or lateral. The headgate may be used in multiple, as checks, to create and maintain different water levels in a ditch with considerable fall, to prevent erosion of the ditch. In the check or contour methods of irrigation, the headgate may be used to irrigate two or more checks or contours at a time, and in an emergency, the headgate may be used to check the flow of water through a ditch bank so that a break may be repaired.

While I have described the principle of operation of the invention, together with the device which I now consider to be the best embodiment thereof, I desire to have it understood that the device shown is merely illustrative, and that such changes may be made when desired as are within the scope of the invention as claimed.

What I claim as new is:

1. In a combination of the character described, a shaft, means for rotatably supporting said shaft, a flexible supporting member extending longitudinally of said shaft and sagging therebelow intermediate the ends of the shaft and supporting member, means connecting said supporting member to said shaft, whereby as said shaft is rotated the sag in said supporting member will be decreased or increased, and a flexible dam mounted upon said supporting member, as and for the purposes set forth.

2. In a combination of the character described, a shaft, means for rotatably supporting said shaft, screws fixed upon said shaft adjacent its end portions, followers mounted upon said screws, means for holding said followers from turning, a flexible supporting member extending longitudinally of said shaft and sagging therebelow intermediate the ends of the shaft, the ends of said supporting member being connected to said followers, whereby as said shaft is rotated the sag in said supporting member will be decreased or increased, and a flexible dam mounted upon said supporting manner, as and for the purposes set forth.

3. In a combination of the character described, a base, housings mounted upon said base in spaced relation with respect to each other, a shaft spanning the distance between said housings and being revolvably mounted thereon, screws fixed upon said shaft within said housings, followers mounted upon said screws, said followers engaging the inner surface of said housings, whereby the followers are held against turning as the shaft is revolved, a flexible supporting member extending longitudinally of said shaft and sagging therebelow intermediate the ends of said shaft, the ends of said supporting member being connected to said followers, whereby as said shaft is rotated the sag in said supporting member will be decreased or increased, and a flexible dam mounted upon said supporting member, as and for the purposes set forth.

4. In a combination of the character described, a base provided with a slot, housings secured to said base in relatively spaced relation, said housings being of inverted U-form in cross section and having their open lower portions in alignment with said slot, transversely extending bars carried by said housings, a shaft spanning the distance between said housings and having its ends turnably mounted in said bars, screws fixed upon said shafts between said bars, thereby holding said shaft against longitudinal movement, followers mounted upon said screws, said followers engaging the inner surfaces of said housings, whereby the followers are held against turning as the shaft is revolved, a flexible supporting member extending longitudinally of said shaft and sagging therebelow through said slot, intermediate the ends of the shaft, the ends of said supporting member being connected to said followers, whereby as said shaft is rotated the sag in said supporting member will be decreased or increased, and a flexible dam mounted upon said supporting member, as and for the purposes set forth.

In testimony whereof I affix my signature.

HOWARD A. BALLARD.